3,024,570
PROCESS AND COMPOSITION FOR SIMULTANEOUSLY SEEDING AND MULCHING SOIL AREAS
Russell H. Dow, Bowmanville, Ontario, Canada, assignor to Allied Chemical Corporation, New York, N.Y., a corporation of New York
No Drawing. Filed Aug. 4, 1960, Ser. No. 47,354
6 Claims. (Cl. 47—58)

This invention relates to a new composition and method adapted for use in the application of seeds to large soil areas, and more particularly, to large scale seeding of irregular areas, including slopes and steep banks, in a manner whereby the applied seeds are artificially mulched and anchored to the soil for a sufficient time to permit germination to take place.

In the seeding of large soil areas, particularly road side slopes, banks, medial strips and park areas contiguous to the modern super-highways, machine spraying of seeds such as grass seeds from an aqueous suspension, has been developed. Where such areas are irregular and, especially, sloping, or present steep banks such as occur in cuts and fills resulting from the maintenance of road bed grades, difficulties are experienced in washing and run-off of seeds and erosion of soil before germination can take place, especially when rains occur soon after seeding.

In the past this difficulty has been mitigated by applying to the newly seeded areas a mulch of straw mixed with melted tar or other bituminous material to bind the straw stalks together and hold them to the ground and prevent run-off of soil and seeds. This mulching treatment is not only expensive, particularly in areas in which straw is not readily available, and involves a high labor cost for an entirely separate operation, but the mulching operation, moreover, leaves an undesirable gummy tar residue on the ground.

An object of the present invention is to provide a fluid seed-containing composition adapted to be applied by machine spraying methods to large irregular soil-bearing areas, particularly sloping areas, and to provide, when so applied, a temporary mulch which holds the seed to the seed-bed for a sufficient time to allow germination of the seeds, and to provide a process for simultaneously applying seeds and temporary mulch to such areas.

Other objects will appear hereinafter.

The above and other objects are accomplished according to my invention wherein an aqueous suspension of seeds in an aqueous dispersion of a readily emulsifiable oxidized polyethylene wax having an average molecular weight between about 600 and about 5,000 and melting point between about 90° C. and about 105° C. is applied as a spray to a soil-bearing area.

Emulsifiable, oxidized polyethylene wax materials especially suitable for use in the compositions of my invention are the emulsifiable, oxidized polyethylene waxes described in co-pending application Serial No. 515,770 of Michael Erchak, Jr., filed June 15, 1955, according to which normally solid, hard, waxy polymers of ethylene, which are saturated aliphatic compounds characterized by a recurring $-CH_2$ group and which have average molecular weights between about 1,000 and about 3,000, are subjected, in the liquid phase, to the action of an oxygen-containing gas to cause reaction of at least about 5 pounds of oxygen per 100 pounds of wax, preferably between about 5 pounds and about 17 pounds of oxygen, per 100 pounds of wax, i.e. to provide an oxidized polyethylene wax containing at least about 3%, preferably between about 3% and about 9% of oxygen by weight, based on the weight of the oxidized wax, and acid numbers of not more than about 50, preferably between about 10 and about 45.

The waxy ethylene polymers which are oxidized as above described, may themselves be prepared by any suitable known methods, for example, by subjecting ethylene, either alone, or in the presence of a co-reactant to temperatures between about 150° C. and about 300° C. and pressures ranging from about 500 p.s.i. to about 7,000 p.s.i. as disclosed in U.S. Patents 2,683,141 and 2,504,400 of Michael Erchak, Jr. Oxidation of the waxy polymers of ethylene may result in oxidized waxes having average molecular weights somewhat less than those of the original waxes. The oxidized polyethylene waxes used in our invention may have average molecular weights between about 600 and about 5,000. Those having average molecular weights between about 1,000 and about 3,000 are preferred.

The aqueous dispersion of the readily emulsifiable, oxidized polyethylene wax may be prepared in any suitable manner. It may be, and preferably is considerably more concentrated than required in the finished composition, and this concentration may vary as convenience dictates.

In general the dispersion may be prepared by first melting the wax together with a higher fatty acid, for example, a $C_{12}$ to $C_{20}$ aliphatic acid, then, with the temperature between about 120° C. and about 130° C., slowly adding a volatile amine such as morpholine, methoxy propyl amine, 2-amino-2-methyl-1-propanol or the like. Suitable aliphatic acids include oleic, lauric, palmitic, stearic, etc. acids. The hot mixture of wax and emulsifying agent is then added gradually with vigorous agitation, to water which has been heated to just below boiling (e.g. 95–99° C.), preferably in such a manner that the hot wax stream spirals down the vortex formed by the agitation, and becomes emulsified as it blends into the water. The emulsion may then be cooled, and remains stable after cooling.

A suitable formula for the emulsified oxidized polyethylene wax is given below:

|  | Parts | Weight percent |
|---|---|---|
| Oxidized Polyethylene wax | 30 | 16.7 |
| Fatty acid | 6 | 3.3 |
| Volatile amine | 6 | 3.3 |
| Water | 138 | 76.7 |
|  | 180 | 100.0 |

Water content may be varied as desired. However, at least about 2 parts of water per part of wax are required to form a satisfactory emulsion concentrate. Such concentrates may be diluted with additional water to any desired degree of dilution.

About equal parts of fatty acid and volatile amine should be used as emulsifier and the ratio of combined emulsifier to wax is preferably maintained between about 0.3:1 and about 0.5:1, by weight.

Other emulsifying agents and/or dispersants may be used if desired including the anionic alkyl amine salts of fatty acids, e.g. mono-ethanol amine salt of lauric acid, long chain alkyl aryl sulfonates such as keryl benzene sodium sulfonate, dodecylbenzene sodium sulfonate, alkyl aryl polyether alcohols, polyoxyethylene-20-sorbitan-tristearate, etc.

The aqueous oxidized polyethylene wax emulsion is diluted with water so as to provide a concentration of between about .25% and about 1.5% of solid wax material in the water, and is mixed with viable seed in the proportion of between about 1% and about 7% by weight based on the total weight of the resulting aqueous dispersion. Fertilizers may be added, if desired, for example, water-soluble nitrogenous fertilizers such as ammonia, urea, nitrogen solutions, etc., providing solution pH values of 6 or above, to provide nitrogen contents in the dispersions between about 1.5% and about 7.5%. Neutral to alkaline fertilizers are preferred. Quantities between about 1% and about 20% of the weight of the aqueous dispersion of such fertilizers are satisfactory. Acidic fertilizers providing solution pH values below about 6 but not lower than about 4 such as the phosphates, ammonium nitrate and ammonium sulfate, etc., may also be used provided suitable acid resistant emulsifiers are used such as, for example, polyoxyethylene-20-sorbitan tristearate and the like.

For application to a soil bed, the mixture of seeds in the aqueous polyethylene emulsion is preferably maintained under agitation and the mixture forced out upon the soil in a spray, using any conventional equipment adapted for spraying coarse mixtures, for example, the so-called "Hydro Seeder" designed for the purpose. This machine consists of a tank having a capacity of about 1,000 gallons or more, and is equipped with an internal agitation system and a rotary pump of 600 gallons per minute capacity connected to a spray pipe through a flexible hose.

The mixture is applied at a rate sufficient to deposit the desired concentration of seed without applying so much liquid as to cause excessive run-off or channeling. In general between about 200 and about 600 Imperial gallons per acre are satisfactory using the seed concentrations indicated above. Upon subsidence of the aqueous portion of the mixture into the soil, a thin, somewhat discontinuous film of solid polyethylene wax appears to form which anchors the seeds to the soil and provides sufficient water repellency to the surface to prevent washing away of the seeds and yet to permit "breathing" of the soil, i.e. access of air and moisture so that germination is not prevented.

The composition and process of my invention provide an advantageous method of applying seeds and mulch in a single operation to large, irregular areas with the result that the seeds are held firmly on the irregularities in contact with the soil until germination takes place to permanently anchor them to the base. My process thus speeds up seeding operations and leaves no undesired film on the areas after seedlings have grown. The seeds are thus anchored or mulched to the soil for a period sufficient for germination to occur, i.e., usually periods between about 7 days and about 3 weeks or more, depending on the type of seed, the locale, the amount and character of rainfall, etc., and the like.

While my process and compositions are especially adapted to applying grass, clover, vetch or other seeds to highway banks and especially to sloping areas, they are also adapted for use in applying seeds to any large irregular areas, such as burned or cut-over forest areas as by aeroplane, to effect reforestation as with tree seeds, or to large prairie areas to be seeded with desirable grasses, cover crops and the like.

The following specific example further illustrates my invention.

EXAMPLE

A machine seeding test of a sloping road bank was carried out by preparing the following mixture

|  | Pounds | Approximate percent by weight |
|---|---|---|
| Permanent grass seed | 250 | 2.8 |
| Field Rye seed | 150 | 1.7 |
| Nitrogenous fertilizer 10.0% nitrogen | 550 | 6.2 |
| Oxidized polyethylene wax emulsion (25% wax) (40 Imperial gallons) | 400 | 4.5 |
| Water |  | (2.815) |
| Wax solids |  | (1.125) |
| Emulsifying agent |  | (0.56) |
| Water | 7,500 | 84.8 |
|  | 8,850 | 100.0 | in a tank equipped with an agitator and having a rotary pump attached to a hose terminating in a spraying device, all mounted on a trailer truck.

With the truck moving along the road, the mixture was sprayed onto the steep, upwardly sloping banks of sub-soil through which the highway had been freshly cut, at the rate of 400 Imperial gallons (10 pounds water per gallon) per acre. Although the slope was quite acute, varying from 15° to 45°, and was rolled and packed quite hard, with very little top soil, the seeds in the mixture were held to the soil base by the wax emulsion and were maintained in place sufficiently long, in spite of subsequent rains, to permit germination of the seeds, as indicated by the log of observations of the tract at intervals after seeding, shown in Table I below:

TABLE I
PROGRESSIVE RAINFALL AND GROWTH PATTERN ON TRACT SEEDED SEPT. 17th WITH AQUEOUS POLYETHYLENE EMULSION-SEED MIXTURE

| Date | Rainfall, in. | Percent of area covered by grass | Percent height of growth based on 5 inch total growth |
|---|---|---|---|
| Sept. 25 | 0.60 | Slight | Slight. |
| Oct. 1 | 0.42 | 20 | About 5. |
| Oct. 10 | 1.10 | 50 | About 15. |
| Oct. 20 | 0.24 | 80 | About 40. |
| Oct. 25 | 1.70 | 80 | About 50. |

The above growth pattern is similar to growth patterns obtained using straw-tar mulches.

Tracts similarly seeded with an aqueous-fertilizer seed mixture but having no mulch show only about 30% growth in similar time because of excessive washing off and erosion of seed.

While the above describes the preferred embodiments of my invention, it will be understood that departures may be made therefrom within the scope of the specification and claims.

I claim:

1. A process for simultaneously seeding and mulching soil surfaces which comprises applying thereto an aqueous emulsion of normally solid oxidized polyethylene wax containing between about 1.0 and about 1.5% by weight of said polyethylene wax solids, said emulsion having dispersed therein between about 1% and about 7% by weight, based on the total weight of the aqueous emulsion, of viable seeds.

2. The process according to claim 1 wherein the seeds are grass seeds.

3. The process according to claim 1, wherein the surface seeded is a sloping surface.

4. An aqueous composition adapted for use in mechanical seeding of irregular soil surfaces which comprises an aqueous emulsion of a normally solid readily emulsifiable, oxidized polyethylene wax, having dispersed therein between about 1% and about 7% by weight, based on the weight of the aqueous emulsion, of viable seeds.

5. The composition according to claim 4, containing, in addition, between about 1% and about 20% by weight of a fertilizer, providing in solution a pH of no less than about 4, based on the weight of the aqueous oxidized polyethylene wax emulsion.

6. A process for simultaneously seeding and mulching soil surfaces which comprises applying thereto an aqueous emulsion of a normally solid oxidized polyethylene wax containing a small but effective amount of said polyethylene wax solids, said emulsion having dispersed therein between about 1% and about 7% by weight, based on the total weight of the aqueous emulsion, of viable seeds.

References Cited in the file of this patent

UNITED STATES PATENTS

| | | |
|---|---|---|
| 2,878,617 | Finn | Mar. 24, 1959 |
| 2,927,402 | Goren | Mar. 8, 1960 |
| 2,940,920 | Garwin | June 14, 1960 |

FOREIGN PATENTS

| | | |
|---|---|---|
| 581,279 | Great Britain | Oct. 7, 1946 |